(12) United States Patent
Bally et al.

(10) Patent No.: US 8,107,915 B2
(45) Date of Patent: Jan. 31, 2012

(54) RECEIVER SYSTEM AND METHOD FOR RECEIVING SIGNALS

(75) Inventors: Nazar F. Bally, Sterling Heights, MI (US); Daniel G. Morris, Ovid, MI (US); Raed S. Shatara, Carmel, IN (US); Steven S. Langston, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 850 days.

(21) Appl. No.: 12/150,414

(22) Filed: Apr. 28, 2008

(65) Prior Publication Data
US 2009/0270059 A1 Oct. 29, 2009

(51) Int. Cl.
*H04B 1/06* (2006.01)
(52) U.S. Cl. .................. 455/277.1; 455/277.2
(58) Field of Classification Search .......... 455/101, 455/272, 276.1, 277.1, 277.2, 278.1, 279.1; 375/267, 347
See application file for complete search history.

(56) References Cited

U.S. PATENT DOCUMENTS

| | | | |
|---|---|---|---|
| 4,394,779 A * | 7/1983 | Hansen ................ | 455/277.2 |
| 5,095,535 A * | 3/1992 | Freeburg .............. | 455/278.1 |
| 5,826,179 A | 10/1998 | Lindenmeier et al. | |
| 7,016,660 B2 | 3/2006 | Meijer et al. | |
| 7,180,444 B2 | 2/2007 | Chintyan | |
| 7,230,569 B1 | 6/2007 | Hules | |
| 7,324,043 B2 | 1/2008 | Purden | |
| 7,558,555 B2 * | 7/2009 | Nagy ................... | 455/277.1 |
| 2006/0182201 A1 | 8/2006 | Lindenmeier et al. | |
| 2007/0132635 A1 | 6/2007 | Dockemeyer, Jr. | |
| 2007/0249312 A1 | 10/2007 | Shatara et al. | |

FOREIGN PATENT DOCUMENTS

| | | |
|---|---|---|
| DE | 102006006266 | 8/2006 |
| EP | 1848118 | 10/2007 |
| FR | 2842373 | 1/2004 |

OTHER PUBLICATIONS

European Search Report dated Sep. 29, 2011.

* cited by examiner

*Primary Examiner* — Thanh Le
(74) *Attorney, Agent, or Firm* — Lawrence D. Hazelton (57) ABSTRACT

A receiver system and method for receiving signals are provided, wherein the system includes a plurality of antenna elements configured to receive a transmitted signal. A receiver device is in communication with the plurality of antenna elements, wherein the receiver device is configured to emit an output based upon the received signal, and communicate a control signal that corresponds to a determined signal quality of the received signal. A switch device is adapted to switch among the plurality of antenna elements to electrically connect a selected antenna element of the plurality of antenna elements to the receiver device. A controller is in communication with the receiver device, such that the controller receives the control signal, wherein the controller commands the switch device to directly switch to any of the antenna elements to electrically connect one of the plurality of antenna elements to the receiver device based upon the control signal.

17 Claims, 7 Drawing Sheets

RECEIVER SYSTEM AND METHOD FOR RECEIVING SIGNALS

TECHNICAL FIELD

The present invention generally relates to a receiver system and method for receiving signals, and more particularly, to a receiver system and method for switching among a plurality of antenna elements to receive a signal.

BACKGROUND OF THE INVENTION

Multipath interference is generally caused when two or more signal rays of an original transmitted signal converge upon a receiving antenna of a receiver system at significantly different times. This misalignment or superposition of several delayed signals, which are generally replicas of the original signal, may cause distortion in audio recovered from the signals.

In various radio frequency (RF) receiver systems, antenna diversity has been implemented in conjunction with a frequency modulated (FM) receiver to reduce degraded reception performance caused by multipath interference. Typically, antenna diversity can been accomplished through the use of two or more uncorrelated antennas. Conventional antenna diversity reception from mobile communication systems has been achieved by a number of different implementations. For example, antenna diversity has been accomplished with equal gain combiner (EGC) systems, maximal ratio combiner (MRC) systems, and antenna diversity systems, such as the adaptive reception system (ARS).

EGC and MRC systems typically utilize signals from all antennas through a variety of combining techniques that attempt to optimize the certain characteristics of the received signals. In a switched antenna diversity system, only one antenna is generally utilized for reception at any instant in time and, thus, the non-selected antennas do not contribute to the demodulated signal. The EGC and MRC systems generally may provide superior performance; however, they also tend to be more expensive to implement and may require multiple receiver analog front ends.

Typically, vehicles are equipped with an antenna for receiving radio signals. One example of such an antenna is a mast antenna, which extends from the exterior body of the vehicle. Generally, the mast antenna often interferes with the desired styling of the vehicle, and the mast antenna's protrusion makes it susceptible to damage.

An alternative to the mast antenna is placing the antenna within glass on the vehicle, such as a windshield of the vehicle. Whether the single antenna is a mast antenna, an in-glass antenna, or other type of antenna, a single antenna typically has inherent limitations under certain conditions, such as those with fading and multipath signal interference resulting from an obstruction, which can be caused by the presence of a building, a mountain, or another vehicle. Furthermore, in-glass antennas typically are susceptible to fading and multipath signal interference due to their gain, their directivity, and their polarization properties. There have been several techniques developed using multiple antennas for receiving radio signals to reduce the effects of such fading and interference.

One exemplary technique is scanning/selection or switching diversity. The scanning/selection or switching diversity technique operates on the premise that if one antenna on the vehicle is receiving a poor signal, another antenna spaced from the first antenna may be receiving a better signal. Typically, the system either compares the signals that are being received by the system's multiple antennas to ascertain which antenna is receiving the better quality signal, or the system evaluates the signal being received by a single antenna to determine a quality of the signal and simply switches to another antenna if the current signal is designated as unacceptable. However, the switching transients caused by switching between antennas can be audible under some circumstances, and since only one antenna is typically used at any point in time, the system may provide only marginal improvement during fringe reception when compared to single antenna systems.

The EGC technique generally combines signals received by the antennas in an antenna array by correcting for the phase differences between antennas, then adding the signals pictorially. No adjustments are made to the signals for any difference in the gains of the input signals because only the phases of the input signals are adjusted for alignment in an equal-gain system. However, it is possible that the signal-to-noise ratio may be less than optimal. For example, if two inputs are combined, and one of those inputs contains mostly noise, the combined signal is likely to be of lower quality than the single non-corrected signal. In such a situation, it would have been ideal to use only the signal from the antenna that was not mostly noise.

Another technique is the MRC technique. In the MRC technique, the input signals are generally adjusted according to the detected phase thereof, the magnitudes of the input signals are adjusted according to the detected phase thereof, and the magnitudes of the input signals are adjusted to yield the maximum signal-to-noise ratio. Thus, a signal that is corrupted with noise does not degrade the overall performance of the system. However, the maximal-ratio combining technique is generally very complex, typically, due to the hardware having multiple receivers plus the combined algorithm for combining the multiple signals. Additionally, the cost of implementing such a system can be prohibitive in some environments.

SUMMARY OF THE INVENTION

According to one aspect of the present invention, a receiver system is provided that includes a plurality of antenna elements, a receiver device, a switch device, and a controller. The plurality of antenna elements are configured to receive a transmitted signal. The receiver device is in communication with the plurality of antenna elements, wherein the receiver device is configured to emit an output based upon the received signal. The receiver device further communicates a control signal that corresponds to a determined signal quality of the received signal. The switch device is adapted to switch among the plurality of antenna elements in order to electrically connect a selected antenna element of the plurality of antenna elements to the receiver device. The controller is in communication with the receiver device, such that the controller receives the the controller receives the control signal, wherein the controller commands the switch device to directly switch to any of the plurality of antenna elements in order to electrically connect one of the plurality of antenna elements to the receiver device based upon the control signal.

According to another aspect of the present invention, a receiver system is provided that includes a plurality of antenna elements, a receiver device, a switch device, and a controller. The plurality of antenna elements are configured to receive a transmitted signal. The receiver device is in communication with the plurality of antenna elements, wherein the receiver device is configured to emit an output based upon the received signal, and communicate a control signal that corresponds to a determined signal quality of the received signal. The switch device is adapted to switch among the plurality of antenna elements to electrically connect a selected antenna element of the plurality of antenna elements to the receiver device. The controller is in communication with the receiver device, such that the controller receives the control signal, wherein the controller commands the switch device to non-sequentially switch among the plurality of antenna elements to electrically connect one of the plurality of antenna elements to the receiver device based upon the control signal. The control signal includes a command for switching to another antenna element of the plurality of antenna elements when the determined signal quality of the selected antenna element is below a threshold value.

According to yet another aspect of the present invention, a method of switching between a plurality of antenna elements is provided that includes the steps of providing a plurality of antenna elements, switching to a selected antenna element of the plurality of antenna elements, and receiving a transmitted signal by the selected antenna element. The method further includes determining a signal quality of the received signal, and communicating a control signal that is representative of the determined signal quality. Additionally, the method includes the step of switching directly to any of the plurality of antenna elements based upon the control signal, wherein the control signal corresponds to the determined signal quality, such that the control signal includes a command for switching directly to any of the other antenna elements of the plurality of antenna elements from the selected antenna element when the determined signal quality of the selected antenna element is below a threshold value.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF PREFERRED EMBODIMENTS

In regards to FIGS. 1-3 and 7, a receiver system is generally shown at reference identifier 10. The receiver system 10 includes a plurality of antenna elements (e.g., $A_1$, $A_2$, $A_3$, $A_4$, ... $A_N$) configured to receive a transmitted signal, and a receiver device generally indicated at 12 that is in electrical communication with the plurality of antenna elements. For purposes of explanation and not limitation, the receiver system 10 is described herein as the plurality of antenna elements including a first antenna element $A_1$, a second antenna element $A_2$, a third antenna element $A_3$, and a fourth antenna element $A_4$. However, it should be appreciated by those skilled in the art that the plurality of antenna elements can include two or more antenna elements or effective antennas created by combining or by altering/tapping one or more antenna elements, and the description herein should not be limited to the exemplary embodiment of the first, second, third, and fourth antenna elements $A_1$, $A_2$, $A_3$, and $A_4$.

The receiver device 12 is configured to emit an output based upon the received signal, and communicate a control signal that corresponds to a determined signal quality of the received signal. The receiver system 10 further includes a switch device 14 adapted to switch among the plurality of antenna elements $A_1$, $A_2$, $A_3$, $A_4$ to electrically connect a selected antenna element of the plurality of antenna elements $A_1$, $A_2$, $A_3$, $A_4$ to the receiver device 12. Additionally, the receiver system 10 includes a controller generally indicated at 16, which is shown as part of and in communication with the receiver device 12, such that the controller 16 receives the control signal, wherein the controller 16 commands the switch device 14 to directly switch to any of the plurality of antenna elements $A_1$, $A_2$, $A_3$, $A_4$ to electrically connect one of the plurality of antenna elements $A_1$, $A_2$, $A_3$, $A_4$ (e.g., the selected antenna element) to the receiver device 12 based upon the control signal, as described in greater detail herein. According to one embodiment, the switch device 14 directly switching to any of the plurality of antenna elements $A_1$, $A_2$, $A_3$, $A_4$ can be a sequential switch (e.g., the switch device 14 switches from the first antenna element $A_1$ to the second antenna element $A_2$) or a non-sequential switch (e.g., the switch device 14 switches from the first antenna $A_1$ to the third antenna element $A_3$).

Typically, the control signal corresponds to the determined signal qualities, such that the control signal includes a command for directly switching to any of the plurality of antenna elements $A_1$, $A_2$, $A_3$, $A_4$ from the selected antenna element when the determined signal quality of the selected antenna element is below a threshold value. By controlling the switch device 14 with a control signal that commands the switch device 14 to directly switch to a specific antenna in any order rather than automatically switching to the next sequential antenna upon reception of the control signal by the switch device 14, there is a high probability of the controller 16 accurately tracking which of the plurality of antenna elements $A_1$, $A_2$, $A_3$, $A_4$ is the selected antenna element that is currently electrically connected to the receiver device 12. Thus, the controller 16 can assume, based upon the signal communicated therefrom, what antenna element $A_1$, $A_2$, $A_3$, $A_4$ is currently selected. This differs from a receiver device that is only capable of sequentially switching among antenna elements (e.g., the command signal is the same signal for each switch command), wherein a switch device may not switch among the antenna elements as commanded (e.g., the switch device does not receive or process the command signal), and a controller can incorrectly assume which antenna element is electrically connected to the receiver device. In such an embodiment, a controller may not know which antenna element is currently selected, whereas the controller 16 is more robust, in that the direct control (e.g., the control signal corresponding to one of the plurality of antenna elements $A_1, A_2, A_3, A_4$) allows the controller 16 to know which antenna element $A_1, A_2, A_3, A_4$ is currently selected with higher confidence or probability.

According to one embodiment, the signal quality is determined by a switched diversity algorithm. In one exemplary embodiment, the switched diversity algorithm implemented to determine the signal quality is calculating and analyzing a signal-to-noise (SNR) ratio, such that the determined SNR is compared to a threshold value. One exemplary system and method of switched diversity is U.S. Patent Application Publication No. 2007/0249312 A1, entitled "RF RECEIVER SYSTEM HAVING SWITCHED ANTENNA DIVERSITY MODULE," which is hereby incorporated herein by reference in its entirety. However, it should be appreciated by those skilled in the art that the determined signal quality can be other measurable forms of measuring a signal quality of a received signal.

Figure 1:
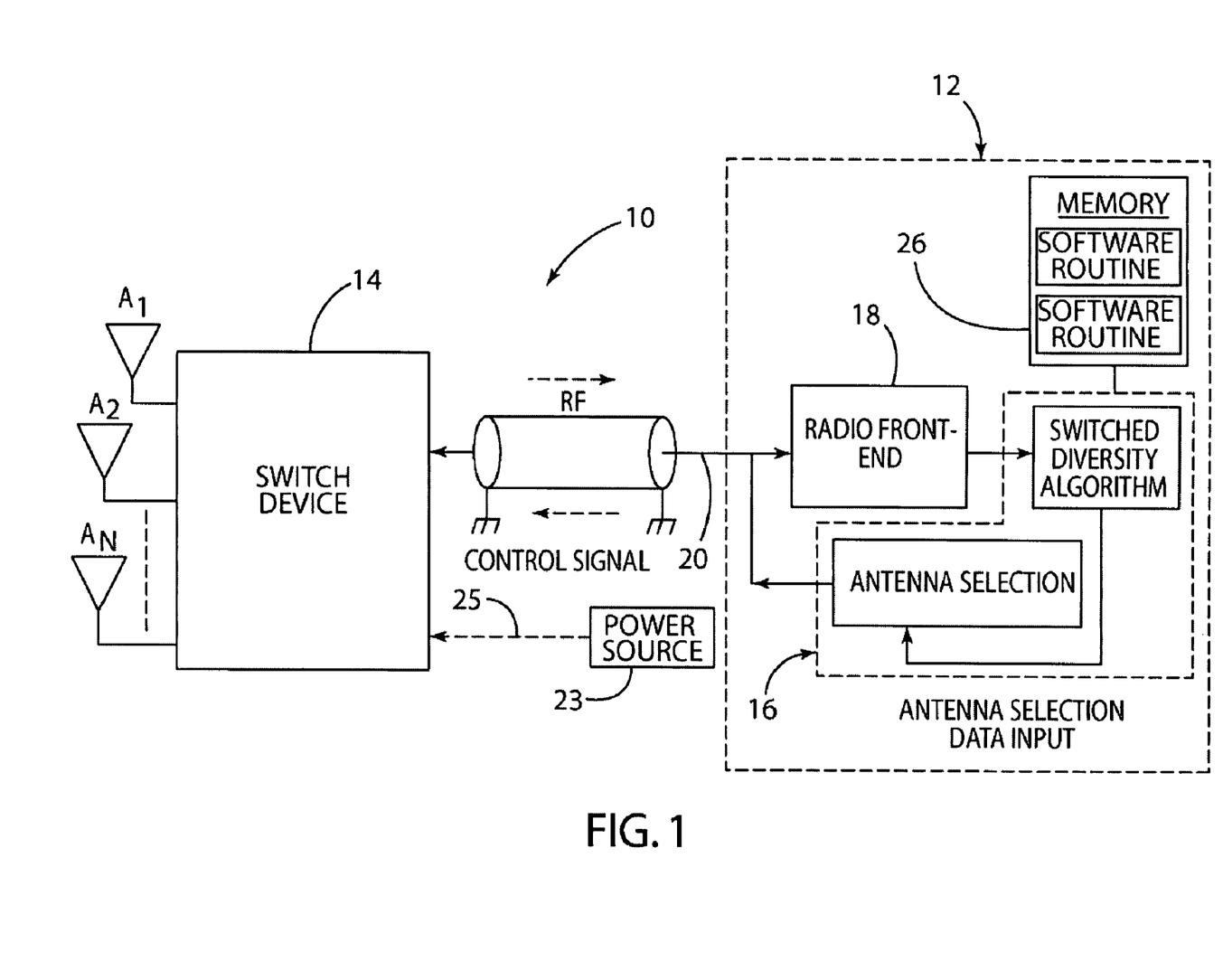
FIG. 1 is a block diagram of a receiver system, in accordance with one embodiment of the present invention.

According to one embodiment, the receiver device 12 includes radio front-end circuitry 18 that receives the signal communicated from the plurality of antenna elements $A_1, A_2, A_3, A_4$ and transmits a signal to the controller 16. The radio front-end circuitry 18 can include, but is not limited to, one or more filters, one or more low-noise amplifiers (LNAs), a down conversion mixer, the like, or a combination thereof. Additionally or alternatively, the controller 16 can be hardware and/or software, such as, but not limited to, a processor that executes one or more software routines stored in memory 26 for determining the signal quality of the received signal and determining which antenna element of the plurality of antenna elements $A_1, A_2, A_3, A_4$ the switch device 14 should directly switch to or select. Other controller circuitry, such as application-specific integrated circuitry (ASIC), may be employed, according to other embodiments.

Typically, a single electrically conductive element 20 electrically connects the receiver device 12 and the switch device 14, according to one embodiment. In such an embodiment, the signal received by the selected antenna element and the control signal are both communicated between the receiver device 12 and the switch device 14 with the single electrically conductive element 20. By way of explanation and not limitation, the electrically conductive element 20 can be, but are not limited to, a coaxial cable, electrically conductive wire, optical communicative wire, such as fiber optics, the like, or a combination thereof. According to one embodiment, an electrical power can be supplied to the switch device 14 from a power source 23 along the first electrically conductive element 20. The power source 23 can be, but is not limited to, a direct current (DC) power source. According to an alternate embodiment, the electrical power supplied from the power source 23 to the switch device 14 is supplied along a second electrically conductive element 25.

Additionally, the controller 16 can command the switch device 14 to switch among the plurality of antenna elements $A_1, A_2, A_3, A_4$ sequentially based upon the received control signal, according to one embodiment. According to one embodiment, the direct switching from an antenna element to another antenna element of the plurality of antenna elements $A_1, A_2, A_3, A_4$ can be a sequential switching (e.g., switch from the first antenna element $A_1$ to a second antenna element $A_2$) or a non-sequential switching (e.g., switch from the first antenna element $A_1$ to the second antenna element $A_3$). In one exemplary embodiment, the control signal includes a command for the switch device 14 to switch to a particular antenna element of the plurality of antenna elements $A_1, A_2, A_3, A_4$, and thus, the antenna element the switch device 14 is switching to can be in sequential order to the currently selected antenna element (e.g., the switch device 14 switching from the first antenna element $A_1$ to the second antenna element $A_2$).

In another exemplary embodiment, the control signal can command the switch device 14 to switch to the next sequential antenna element from the currently selected antenna element without regard to the designated indicator of the plurality of antenna elements $A_1, A_2, A_3, A_4$, such that the control signal does not directly correspond to one of the plurality of antenna elements $A_1, A_2, A_3, A_4$, but instead includes a command to switch to the next antenna element in sequential order from the currently selected antenna element. In such an embodiment, the control signal can be a universal control signal so that the same command signal is being used for all the switching commands, since the antenna elements do not need to be identified in the control signal. Alternatively, the switch device 14 is configured to receive a control signal that identifies a specific antenna element to be switched to, and a universal control signal, so that the switch device 14 switches to the next sequential antenna element from the currently selected antenna element.

Figure 2:
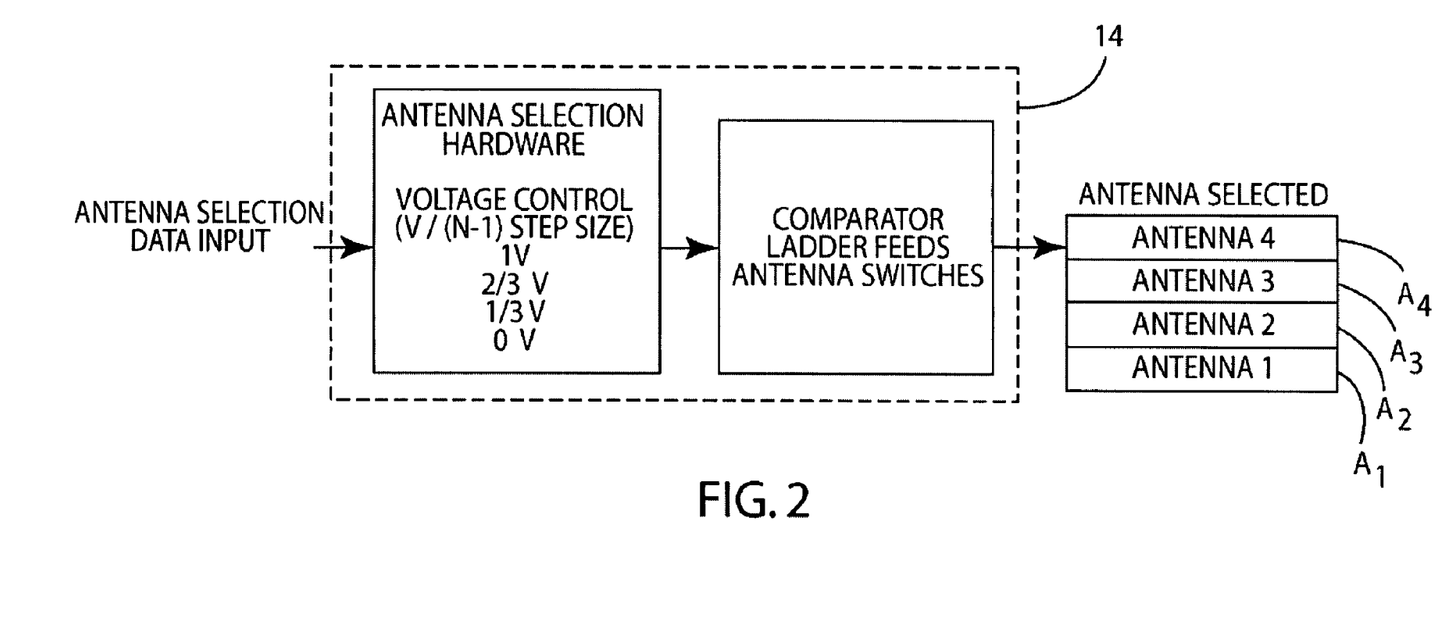
FIG. 2 is a block diagram of a controller and a switch device of a receiver system illustrating the selection of one of a plurality of antenna elements, in accordance with one embodiment of the present invention.
Figure 7:
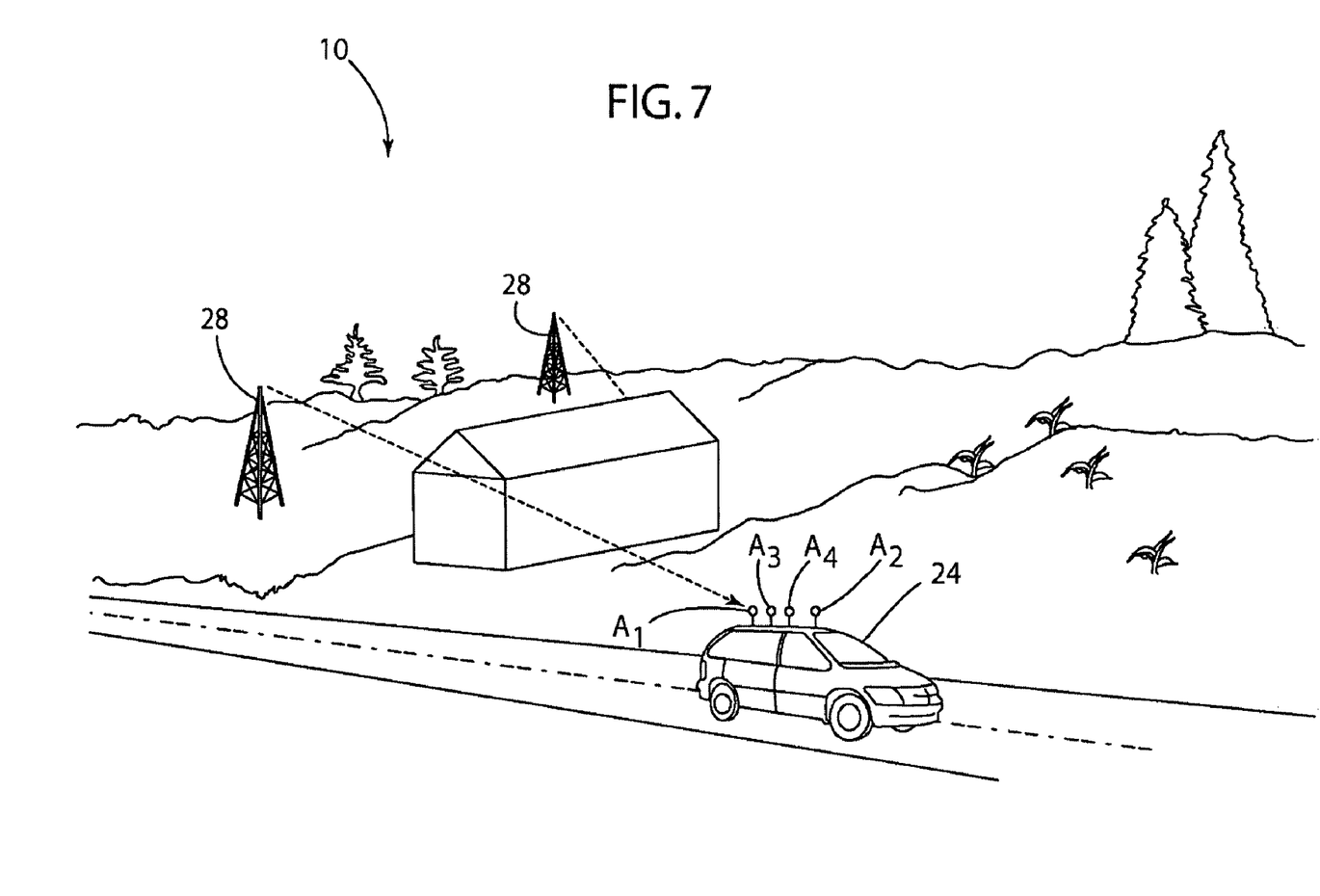
FIG. 7 is an environmental view of a receiver system, in accordance with one embodiment of the present invention.

In regards to FIGS. 1-2 and 7, each of the plurality of antenna elements $A_1, A_2, A_3, A_4$ have a designated voltage potential, such that the control signal includes an electrical power supplied at a voltage potential so that the controller 16 commands the switch device 14 to switch to one of the plurality of antenna elements $A_1, A_2, A_3, A_4$, which has the designated voltage potential value that corresponds to the voltage potential of the control signal. For purposes of explanation and not limitation, the first antenna element $A_1$ can have a designated voltage potential value of zero (0) Volts, the second antenna element $A_2$ can have a designated voltage potential value of one-third (⅓) Volts, the third antenna element $A_3$ can have a designated voltage potential of two-thirds (⅔) Volts, and the fourth antenna element $A_4$ can have a designated voltage potential of one (1) Volt, in an exemplary embodiment. Thus, when the control signal has a specific voltage potential, the switch device 14 can directly switch to the antenna element that has the corresponding designated voltage potential, which can provide for a selective switching among antenna elements (e.g., the switch device 14 switching from the first antenna element $A_1$ to the third antenna element $A_3$).

Figure 3:
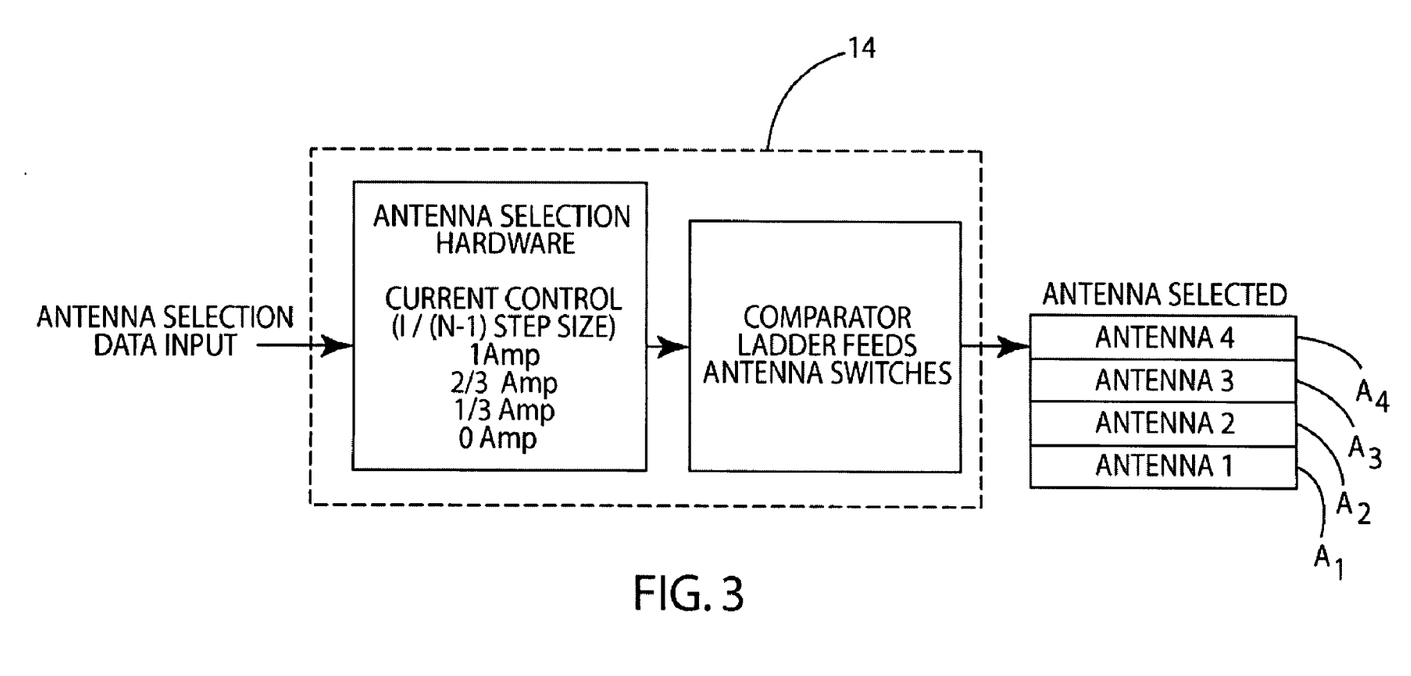
FIG. 3 is a block diagram of a controller and a switch device of a receiver system illustrating the selection of a plurality of antenna elements, in accordance with another embodiment of the present invention.
Figure 4:
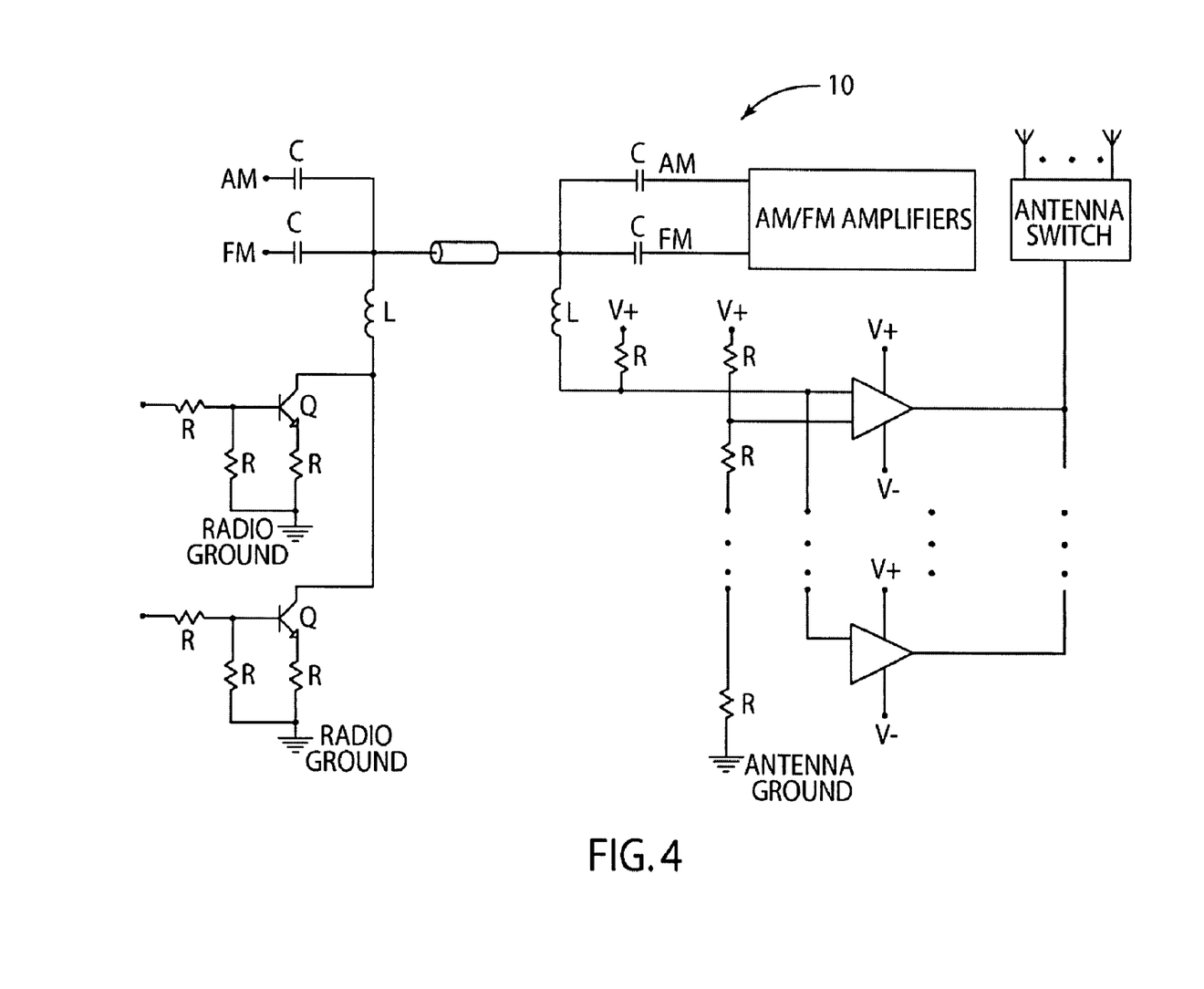
FIG. 4 is a circuit schematic of a receiver system, in accordance with another embodiment of the present invention.

With respect to FIGS. 1, 3, and 7, according to an alternate embodiment, each of the plurality of antenna elements $A_1, A_2, A_3, A_4$ can have a designated electrical current value, such that the control signal includes an electrical power with an electrical current supplied to the switch device 14 so that the controller 16 commands the switch device 14 to switch to one of the plurality of antenna elements $A_1, A_2, A_3, A_4$, which has a designated electrical current value that corresponds to the electrical current of the control signal. For purposes of explanation and not limitation, the designated electrical current value of the first antenna element $A_1$ is zero Amperes (0 A or Amps), the designated electrical current value of the second antenna element $A_2$ is one-third Amps (⅓ A), the designated electrical current value of the third antenna element $A_3$ is two-thirds Amps (⅔ A), and the designated electrical current value of the fourth antenna element $A_4$ is one Amp (1 A), in an exemplary embodiment. Thus, when the control signal has a specific electrical current value, the switch device 14 can directly switch to the antenna element that has the corresponding designated electrical current value, which can provide for a selected switching among antenna elements (e.g., the switch device 14 switching from the first antenna element $A_1$ to the third antenna element $A_3$).

Figure 5:
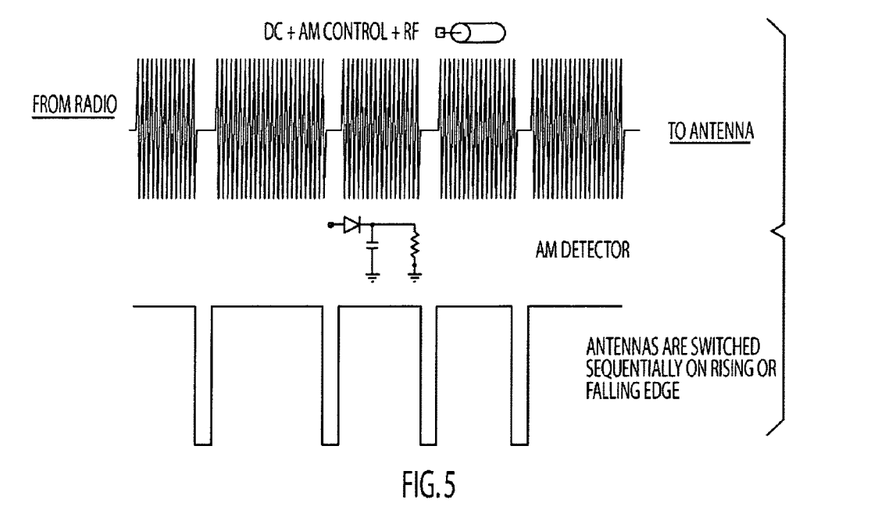
FIG. 5 is an illustration of a communicated signal for sequentially switching among a plurality of antenna elements, in accordance with one embodiment of the present invention.

In regards to FIGS. 1 and 4-7, according to an alternate embodiment, each of the plurality of antenna elements $A_1$, $A_2$, $A_3$, $A_4$ has a designated value and the control signal is modulated, such that the controller 16 commands the switch device 14 to switch to one of the plurality of antenna elements $A_1$, $A_2$, $A_3$, $A_4$, which has a designated value that corresponds to the modulated control signal. For purposes of explanation and not limitation, the control signal can be modulated, such that the amplitude of the signal is varied, the duty cycle of the signal is varied (e.g., pulse width modulation (PWM)), binary data is included in the control signal, multi-level data is included in the control signal, the like, or a combination thereof. As shown in FIG. 5, the control signal is modulated to create pulses of equal value, such that the controller 16 is commanding the switch device 14 to switch among the plurality of antenna elements $A_1$, $A_2$, $A_3$, $A_4$ sequentially.

Figure 6:
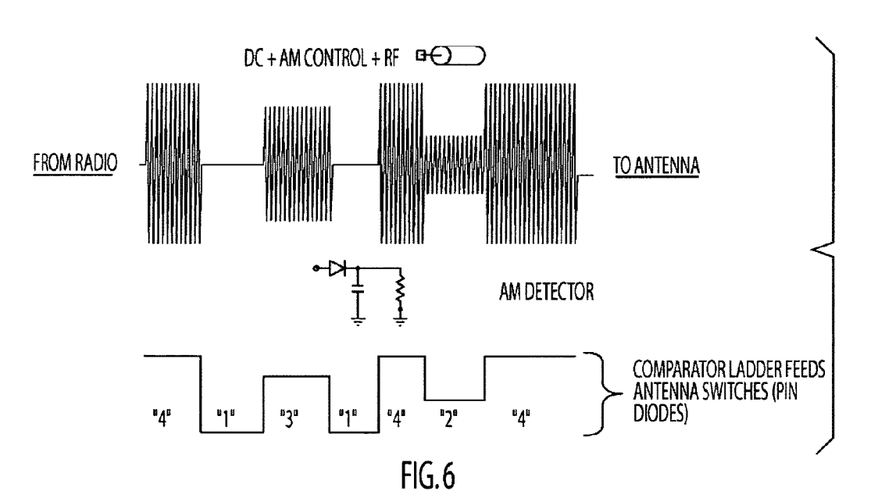
FIG. 6 is an illustration of a communicated signal for directly switching to any of a plurality of antenna elements, in accordance with one embodiment of the present invention.

Alternatively, in FIG. 6, the modulated signal is illustrated having different pulses, wherein each different modulated pulse corresponds to one of the plurality of antenna elements $A_1$, $A_2$, $A_3$, $A_4$, which the controller 16 is commanding the switch device 14 to directly switch to the corresponding antenna element. In such an embodiment, the amplitude of the pulse can correspond to a value designated to one of the plurality of antenna elements $A_1$, $A_2$, $A_3$, $A_4$.

With respect to FIGS. 1-7, the receiver system 10 can be integrated with a vehicle 24 (FIG. 7), according to one embodiment. However, it should be appreciated by those skilled in the art that the receiver system 10 can be mobile by being a mobile device (e.g., handheld), or integrate with other mobile devices or apparatuses. Typically, at least one transmitter 28 transmits a radio frequency (RF) signal, which is received by the receiver device 12. However, it should be appreciated by those skilled in the art that the signal can be transmitted at other suitable frequencies, such as, but not limited to, a communication satellite. The vehicle 24 can be mobile, such that the controller 16 can command the switch device 14 to switch to a desired antenna element $A_1$, $A_2$, $A_3$, $A_4$ if the currently selected antenna element is receiving the signal at an undesirable signal quality (e.g., below the threshold value). Additionally, by switching among the plurality of antenna elements $A_1$, $A_2$, $A_3$, $A_4$ in any order, the controller 16 does not have to switch between a series of antenna elements to electrically connect the desired antenna element to the receiver device 12.

By way of explanation and not limitation, if the first antenna element $A_1$ is the currently selected antenna element, the controller 16 commands the switch device 14 to switch to the third antenna element $A_3$, then the control signal communicated to the switch device 14 can command the switch device 14 to switch directly from the first antenna element $A_1$ to the third antenna element $A_3$ without switching to the second antenna element $A_2$. Therefore, the output emitted by the receiver device 12 is not affected by an undesirable connection to the second antenna element $A_2$, as it would be if the switch device 14 sequentially switched among the antenna elements $A_1$, $A_2$, $A_3$, $A_4$.

Additionally, the receiver device 12 can include memory 26, such that the memory 26 is configured to store a history of the determined signal quality for at least a portion of the plurality of antenna elements $A_1$, $A_2$, $A_3$, $A_4$ over a period of time, such that the control signal is based upon the signal quality of the selected antenna element and the stored history of the determined signal qualities, according to one embodiment. In such an embodiment, the stored history can be a recent history, such that the recent stored history represents the signals received by the plurality of antenna elements $A_1$, $A_2$, $A_3$, $A_4$, since the vehicle 24 had lost power or turned off. For purposes of explanation and not limitation, if the second antenna element $A_2$ has a stored history of producing undesirable outputs, then the controller 16 can command the switch device 14 to directly switch to any of the other of the plurality of antenna elements $A_1$, $A_3$, $A_4$, and skip the second antenna element $A_2$ in order to prevent an undesirable output from the signal received by the second antenna element $A_2$. However, if the switch device 14 were to sequentially switch among the plurality of antenna elements $A_1$, $A_2$, $A_3$, $A_4$, the receiver device 12 would emit the output based upon the signal received by the second antenna element $A_2$ to determine the signal reception is insufficient, that another antenna element should be used, and the switch device 14 should switch to the third antenna element $A_3$.

Additionally or alternatively, the controller 16 can command the switch device 14 to directly switch to any of the plurality of antenna elements $A_1$, $A_2$, $A_3$, $A_4$ by implementing a switching algorithm (e.g., executing one or more software routines) that can result in sequential or non-sequential switches. In one exemplary embodiment, if the signal quality of the first antenna element $A_1$ is below a threshold value, the controller 16 can command the switch device 14 to switch to the second antenna element $A_2$ (i.e., a sequential switch), and if the signal quality of the second antenna element $A_2$ is worse than the signal quality of the first antenna element $A_1$, then the controller 16 can command the switch device 14 to switch back to the first antenna element $A_1$. After that, if the signal quality of the first antenna element $A_1$ remains below the threshold value, then the controller 16 can command the switch device 14 to switch to the third antenna element (i.e., a non-sequential switch). However, it should be appreciated by those skilled in the art that other adequate switching algorithms can be used that include a direct switch among antenna elements that results in a sequential switching, a non-sequential switching, or a combination thereof.

Figure 8:
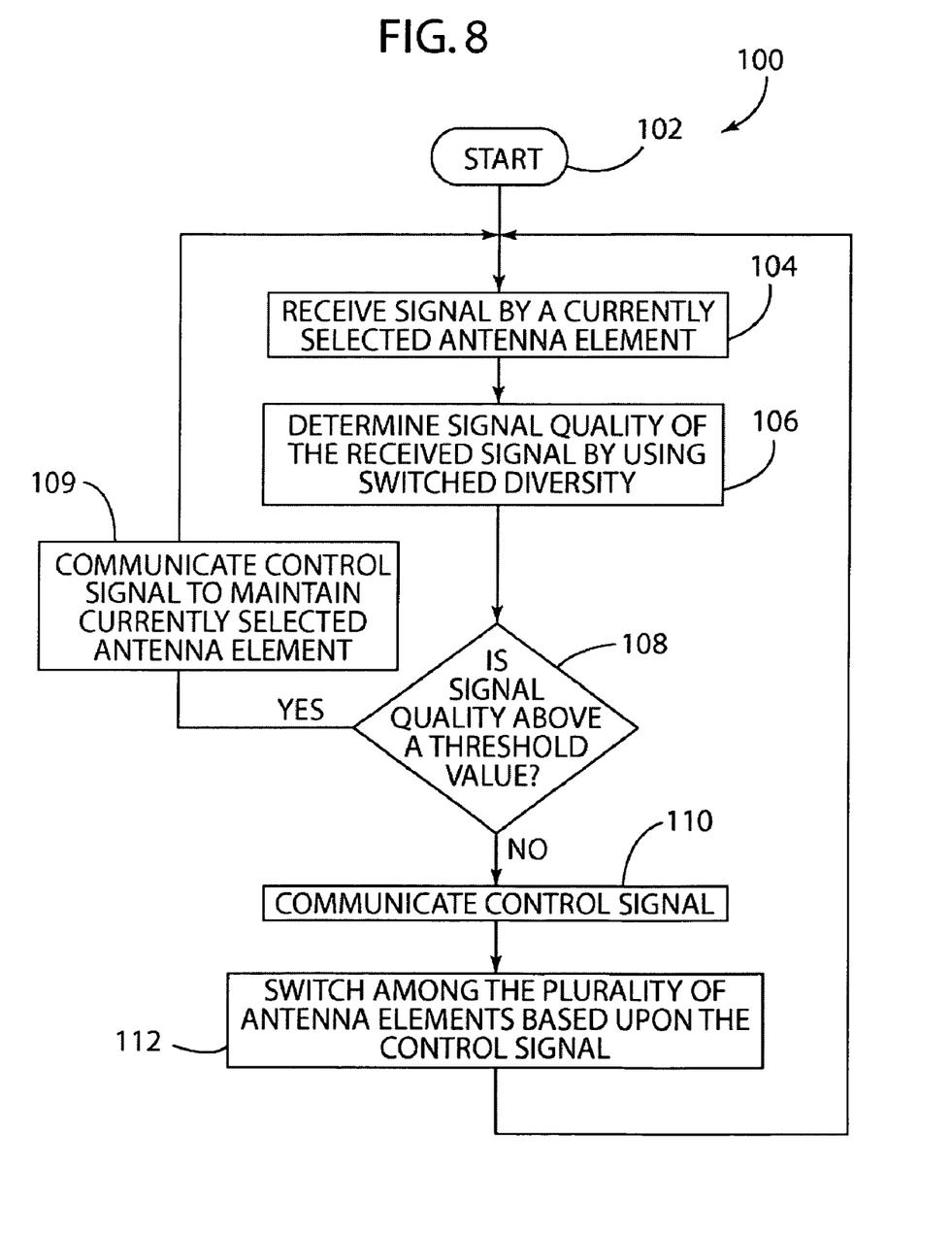
FIG. 8 is a flow chart illustrating a method of switching among a plurality of antenna elements, in accordance with one embodiment of the present invention.

With respect to FIGS. 1-8, a method of switching between a plurality of antenna elements $A_1$, $A_2$, $A_3$, $A_4$ is generally shown in FIG. 8 at reference identifier 100. The method 100 starts at step 102, and proceeds to step 104, wherein a signal is received by a currently selected antenna element $A_1$, $A_2$, $A_3$, $A_4$. Thus, the switch device 14 electrically connects the selected antenna element to the receiver device 12, such that the receiver device 12 is emitting an output based upon the signal received by the selected antenna element. The method 100 then proceeds to step 106, wherein the signal quality of the received signal is determined. Typically, the signal quality of the received signal is determined by using a switched diversity.

At decision step 108, it is determined if the signal quality is above a threshold value. If it is determined at decision step 108 that the signal quality is above the threshold value, then the method 100 proceeds to step 109, wherein the control signal is communicated to maintain the currently selected antenna element. The method 100 can then return to step 104, wherein the signal is continued to be received by the currently selected antenna element.

However, if it is determined at decision step 108 that the signal quality is not above the threshold value, then the method 100 proceeds to step 110, wherein the control signal is communicated. Typically, the control signal is communicated from the controller 16, which determines the signal quality of the currently received signal, and the control signal is communicated to the switch device 14. At step 112, the switch device 14 switches among the plurality of antenna elements $A_1, A_2, A_3, A_4$ based upon the control signal. The method 100 can then return to step 104, wherein the signal is received by a currently selected antenna element. According to one embodiment, the switch device 14 directly switches among the plurality of antenna elements $A_1, A_2, A_3, A_4$ to any of the other antenna elements of the plurality of antenna elements $A_1, A_2, A_3, A_4$.

Advantageously, the receiver system 10 and method 100 can directly switch to any of the plurality of antenna elements $A_1, A_2, A_3, A_4$ based upon at least the signal quality of the currently received signal. Additionally, the history of signal qualities can be stored for each antenna element $A_1, A_2, A_3, A_4$, such that the antenna elements $A_1, A_2, A_3, A_4$ are switched among based upon the determined signal quality and the stored history of signal qualities for each antenna element. Therefore, if it is anticipated that the signal quality of one of the antenna elements is going to be undesirable, the switch device 14 can switch directly from the currently selected antenna element to another one of the plurality of antenna elements $A_1, A_2, A_3, A_4$. Further, a single electrically conductive element (e.g., electrically conductive element 20) can be used to communicate the control signal and the received signal between the receiver device 12 and the switch device 14. It should be appreciated by those skilled in the art that additional or alternative advantages can result from the receiver system 10 and method 100. It should further be appreciated by those skilled in the art that the above elements described in the receiver system 10 and method 100 can be combined in alternative ways.

The above description is considered that of preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims, as interpreted according to the principles of patent law, including the doctrine of equivalents.

The invention claimed is:

1. A receiver system comprising:
   a plurality of antenna elements configured to receive a transmitted signal;
   a receiver device in communication with said plurality of antenna elements, wherein said receiver device is configured to emit an output based upon said received signal, and communicate a control signal that corresponds to a determined signal quality of said received signal;
   a switch device adapted to switch among said plurality of antenna elements to electrically connect a selected antenna element of said plurality of antenna elements to said receiver device; and
   a controller in communication with said receiver device, such that said controller receives said control signal, wherein said controller commands said switch device to directly switch to any of said plurality of antenna elements to electrically connect one of said plurality of antenna elements to said receiver device based upon said control signal, wherein a single electrically conductive element electrically connects said receiver device and said switch device, such that said signal received by said selected antenna element and said control signal are both communicated between said receiver device and said switch device by said single electrically conductive element.

2. The receiver system of claim 1, wherein said control signal corresponds to said determined signal quality, such that said control signal comprises a command for switching directly to another antenna element of said plurality of antenna elements in any order to said selected antenna element when said determined signal quality of said selected antenna element is below a threshold value.

3. The receiver system of claim 1, wherein said controller commands said switch device to directly switch among said plurality of antenna elements non-sequentially based upon said received control signal.

4. The receiver system of claim 1, wherein each of said plurality of antenna elements has a designated voltage potential value, such that said control signal comprises an electrical power supplied at a voltage potential so that said controller commands said switch device to switch to one of said plurality of antenna elements which has said designated voltage potential value that corresponds to said voltage potential of said control signal.

5. The receiver system of claim 1, wherein each of said plurality of antenna elements has a designated electrical current value, such that said control signal comprises an electrical current supplied to said switch device so that said controller commands said switch device to switch to one of said plurality of antenna elements which has said designated electrical current value that corresponds to said electrical current of said control signal.

6. The receiver system of claim 1, wherein each of said plurality of antenna elements has a designated value and said control signal is modulated, such that said controller commands said switch device to switch to one of said plurality of antenna elements, which has said designated value that corresponds to said modulated control signal.

7. The receiver system of claim 1, wherein said receiver device is configured to store a history of said determined signal quality for at least a portion of said plurality of antenna elements over a period of time, such that said control signal is based upon said determined signal quality of said selected antenna element and said stored history of determined signal qualities.

8. The receiver system of claim 1, wherein said receiver system is integrated with a vehicle.

9. A receiver system comprising:
   a plurality of antenna elements configured to receive a transmitted signal;
   a receiver device in communication with said plurality of antenna elements, wherein said receiver device is configured to emit an output based upon said received signal, and communicate a control signal that corresponds to a determined signal quality of said received signal;
   a switch device adapted to switch among said plurality of antenna elements to electrically connect a selected antenna element of said plurality of antenna elements to said receiver device; and
   a controller in communication with said receiver device, such that said controller receives said control signal, wherein said controller commands said switch device to non-sequentially electrically switch among said plurality of antenna elements to electrically connect one of said plurality of antenna elements to said receiver device based upon said control signal, and said control signal comprises a command for switching to another antenna element of said plurality of antenna elements when said determined signal quality of said selected antenna element is below a threshold value, wherein a single electrically conductive element electrically connects said receiver device and said switch device, such that said signal received by said selected antenna element and said control signal are both communicated between said receiver device and said switch device by said single electrically conductive element.

10. The receiver system of claim 9, wherein each of said plurality of antenna elements has a designated voltage potential value, such that said control signal comprises an electrical power supplied at a voltage potential so that said controller commands said switch device to switch to one of said plurality of antenna elements which has said designated voltage potential value that corresponds to said voltage potential of said control signal.

11. The receiver system of claim 9, wherein each of said plurality of antenna elements has a designated electrical current value, such that said control signal comprises an electrical current supplied to said switch device so that said controller commands said switch device to switch to one of said plurality of antenna elements which has said designated electrical current value that corresponds to said electrical current of said control signal.

12. The receiver system of claim 9, wherein each of said plurality of antenna elements has a designated value and said control signal is modulated, such that said controller commands said switch device to switch to one of said plurality of antenna elements, which has said designated value that corresponds to said modulated control signal.

13. The receiver system of claim 9, wherein said receiver device is configured to store a history of said determined signal quality for each of said plurality of antenna elements over a period of time, such that said control signal is based upon said determined signal quality of said selected antenna element and said stored history of determined signal qualities.

14. A method of switching between a plurality of antenna elements, said method comprising the steps of:
providing a plurality of antenna elements;
providing a receiver device, switch device, and a controller in electrical communication with said plurality of antenna elements, wherein said switch device and said receiver device by a single electrically conductive element, such that said received signal is communicated from said switch device to said receiver device through said single electrically conductive element, and said control signal is communicated through said single electrically conductive element;
switching to a selected antenna element of said plurality of antenna elements;
receiving a transmitted signal by said selected antenna element;
determining a signal quality of said received signal;
communicating a control signal that corresponds to said determined signal quality; and
switching directly to any of said plurality of antenna elements based upon said control signal, wherein said control signal corresponds to said determined signal quality, such that said control signal comprises a command for switching directly to any of the other antenna elements of said plurality of antenna elements from said selected antenna element when said determined signal quality of said selected antenna element is below a threshold value.

15. The method of claim 14, wherein said step of directly switching among said plurality of antenna elements further comprises non sequentially switching among said plurality of antenna elements.

16. The method of claim 14 further comprising the step of storing said determined signal qualities for each of said plurality of antenna elements over a period of time, wherein said control signal is based upon said stored history.

17. The method of claim 14, wherein said method of switching between a plurality of antenna elements is integrated with a receiver system that is adapted to be used with a vehicle.

* * * * *